United States Patent
Tang

(10) Patent No.: US 9,897,875 B2
(45) Date of Patent: Feb. 20, 2018

(54) TRANSPARENT DISPLAY

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 182 days.

(21) Appl. No.: 15/059,342

(22) Filed: Mar. 3, 2016

(65) Prior Publication Data

US 2017/0146849 A1    May 25, 2017

(30) Foreign Application Priority Data

Nov. 20, 2015    (CN) .......................... 2015 1 0817965

(51) Int. Cl.
*G02F 1/1335* (2006.01)
*G02F 1/1347* (2006.01)
(Continued)

(52) U.S. Cl.
CPC ....... *G02F 1/13471* (2013.01); *G02B 6/0023* (2013.01); *G02F 1/1368* (2013.01); *G02F 1/13363* (2013.01); *G02F 1/133528* (2013.01); *G02F 2001/133631* (2013.01); *G02F 2001/133638* (2013.01); *G02F 2201/52* (2013.01)

(58) Field of Classification Search
CPC ........... G02F 1/13471; G02F 1/133528; G02F 1/13363; G02F 1/1368; G02F 2001/133638; G02B 6/0023

USPC .................................................. 349/117–119
See application file for complete search history.

(56) References Cited

U.S. PATENT DOCUMENTS

2002/0159013 A1* 10/2002 Faris .................... G02B 5/3033
                                                                349/124
2006/0126156 A1*  6/2006 Evans ................... G02F 1/1323
                                                                359/320

(Continued)

FOREIGN PATENT DOCUMENTS

CN          1716055 A       1/2006
CN        103048829 A       4/2013
(Continued)

*Primary Examiner* — Hoan C Nguyen
(74) *Attorney, Agent, or Firm* — Andrew C. Cheng

(57) ABSTRACT

The present invention discloses a transparent display, comprising a backlight module, a lower polarizer, a phase delay thin film, a liquid crystal layer and an upper polarizer, which are sequentially stacked up in an image display direction, and the transparent display alternately comprises a plurality of transparent regions and a plurality of display regions in a first direction perpendicular with the image display direction, and the phase delay thin film comprises a plurality of first phase delay thin films located in the plurality of transparent regions and a plurality of second phase delay thin films located in the plurality of display regions, and the plurality of first phase delay thin films provide a first phase delay, and the plurality of second phase delay thin films provide a second phase delay, and a difference of the first phase delay and the second phase delay is $\lambda/2$.

7 Claims, 7 Drawing Sheets

(51) Int. Cl.
 *F21V 8/00* (2006.01)
 *G02F 1/13363* (2006.01)
 *G02F 1/1368* (2006.01)

(56) References Cited

U.S. PATENT DOCUMENTS

| | | | | |
|---|---|---|---|---|
| 2013/0016307 A1* | 1/2013 | Jeong | ............... | G02F 1/133615 349/61 |
| 2013/0329288 A1* | 12/2013 | Yim | ................... | H01L 51/5281 359/483.01 |
| 2014/0192296 A1* | 7/2014 | Hsiao | ................ | G02F 1/133533 349/96 |
| 2015/0138455 A1* | 5/2015 | Liao | ..................... | G02F 1/1323 349/15 |

FOREIGN PATENT DOCUMENTS

| CN | 103901667 A | 7/2014 |
|---|---|---|
| JP | 4813217 B2 | 11/2011 |
| KR | 20130112285 A | 10/2013 |

* cited by examiner

TRANSPARENT DISPLAY

FIELD OF THE INVENTION

The present invention relates to a transparent display technology field, and more particularly to a transparent display.

BACKGROUND OF THE INVENTION

The transparent display means that the display itself possesses the light penetration of a certain degree, which can allow the user can clearly see the background behind the display as watching the display image of the display. Therefore, the transparent display is applied for building widows, car windows or shop windows.

The transparent display comprises transparent regions (i.e. capable of transmitting the external light) and display regions (RGB pixel regions). Meanwhile, the common display modes have TN (Twisted Nematic), IPS (In Plane switching), FFS (Fringe Field Switching), multi-domain VA (Vertical alignment). In most usage scenarios, the transparent display is required to be in a transparent state and not to perform display in the most of the time. Only when people need to watch the display image, the transparent display or the opaque display is performed. In the display technologies according to prior art, the IPS/FFS, multi-domain VA modes have display quality advantages of wide view angle, high contrast than the TN mode. However, the transparent regions of the transparent display performing display in the IPS/FFS, multi-domain VA modes are in the normally black display mode. Only the voltages are applied to the transparent regions of the aforesaid transparent display, the transparent condition of the transparent regions can be maintained. Therefore, the power consumption of the aforesaid transparent display is large and the application field is restricted.

SUMMARY OF THE INVENTION

An objective of the present invention is to provide a transparent display with low power consumption.

For realizing the aforesaid objective, the technical solution utilized by the embodiments of the present invention is:

The present invention provides a transparent display, comprising a backlight module, a lower polarizer, a phase delay thin film, a liquid crystal layer and an upper polarizer, which are sequentially stacked up in an image display direction, and the transparent display alternately comprises a plurality of transparent regions and a plurality of display regions in a first direction perpendicular with the image display direction, and the phase delay thin film comprises a plurality of first phase delay thin films located in the plurality of transparent regions and a plurality of second phase delay thin films located in the plurality of display regions, and the plurality of first phase delay thin films provide a first phase delay, and the plurality of second phase delay thin films provide a second phase delay, and a difference of the first phase delay and the second phase delay is $\lambda/2$.

Preferably, a polarization axis of the upper polarizer is perpendicular with a polarization axis of the lower polarizer, and the first phase delay thin film delays a phase of light with $\lambda/2$, and an extension direction of the polarization axis of the lower polarizer and an extension axis of a fast axis of the first phase delay thin film form a 45° included angle, and a phase delay value of the second phase delay thin film is 0.

Preferably, a polarization axis of the upper polarizer is parallel with a polarization axis of the lower polarizer, and a phase delay value of the first phase delay thin film is 0, and the second phase delay thin film delays a phase of light with $\lambda/2$, and an extension direction of the polarization axis of the lower polarizer and an extension axis of a fast axis of the second phase delay thin film form a 45° included angle.

Preferably, the backlight module comprises a light guide plate and a backlight source, and the light guide plate comprises an incident surface and an illuminating surface which are oppositely located and a side incident surface connected between the incident surface and the illuminating surface, and the illuminating surface of the light guide plate is located adjacent to the lower polarizer, and the backlight source is adjacent to the side incident surface of the light guide plate.

Preferably, the backlight module further comprises a backlight polarization plate, and the backlight polarization plate is located between the light guide plate and the backlight source, and a polarization axis of the backlight polarization plate is parallel with a polarization axis of the lower polarizer.

Preferably, the liquid crystal layer does not change a vibration direction of a linear polarization light in condition of no power supply.

Preferably, the transparent display further comprises a first substrate and a second substrate, and the first substrate is located between the upper polarizer and the liquid crystal layer, and the second substrate is located between the liquid crystal layer and the phase delay thin film.

Preferably, the transparent display further comprises a first substrate and a second substrate, and the first substrate is located between the upper polarizer and the liquid crystal layer, and the second substrate is located between the phase delay thin film and the lower polarizer.

Preferably, the transparent regions are non color resist regions or white color resist regions, and the plurality of transparent regions are electrically coupled to the same switch.

Preferably, the transparent regions are non color resist regions or white color resist regions, and each transparent region correspondingly comprises a thin film transistor.

Compared with prior art, the present invention possesses benefits below:

In the transparent display of the present invention, the backlight module, the lower polarizer, the phase delay thin film, the display screen and the upper polarizer are sequentially stacked up, and the delay phase difference of the first phase delay thin films of the phase delay thin film in the transparent regions and the second phase delay thin films in the display regions is $\lambda/2$. Thus, the transparent regions of the transparent display can achieve the transparent bright state in condition that the transparent display is not powered to reduce the power consumption of the transparent display.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments.

Figure 1:
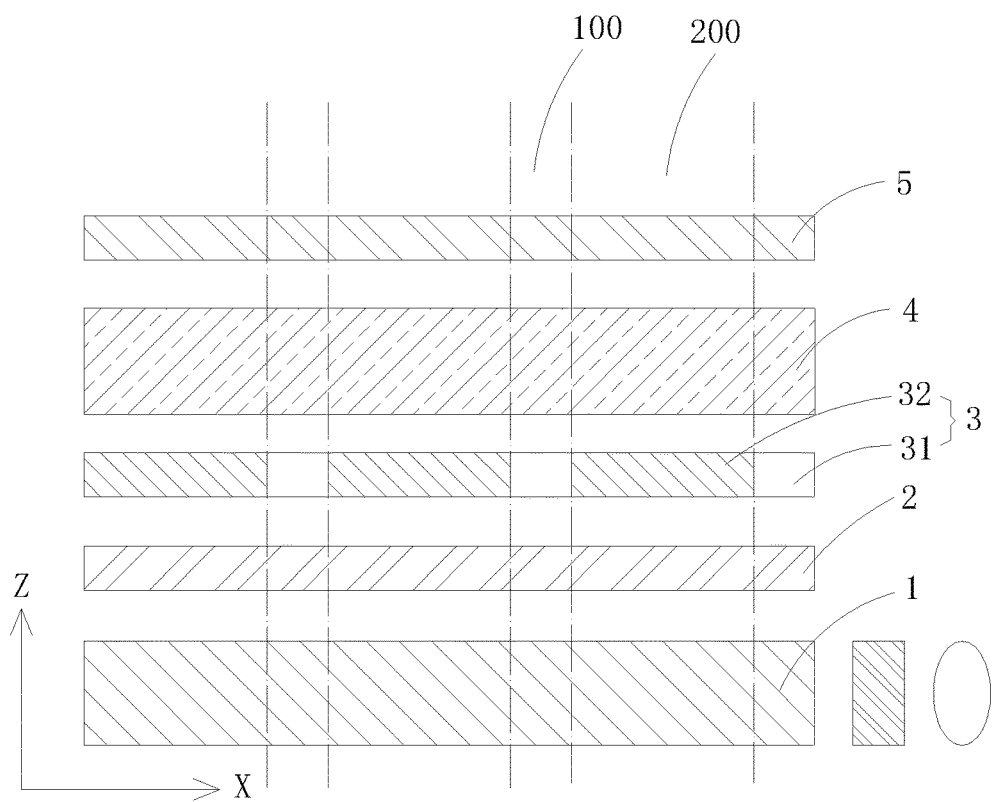
FIG. 1 is a structure diagram of a transparent display provided by the embodiment of the present invention.

Please refer to FIG. 1. FIG. 1 is a structure diagram of a transparent display provided by the embodiment of the present invention. The embodiment of the present invention provides a transparent display, comprising a backlight module 1, a lower polarizer 2, a phase delay thin film 3, a liquid crystal layer 4 and an upper polarizer 5, which are sequentially stacked up in an image display direction Z. As shown in FIG. 1, the transparent display alternately comprises a plurality of transparent regions 100 and a plurality of display regions 200 in a first direction perpendicular with the image display direction Z. In the image display direction Z, the phase delay thin film 3 comprises a plurality of first phase delay thin films 31 (the blank parts on the phase delay thin film 3 as shown in FIG. 1) located in the plurality of transparent regions 100 and a plurality of second phase delay thin films 32 located in the plurality of display regions 200 (the shadow parts on the phase delay thin film 3 as shown in FIG. 1). The plurality of first phase delay thin films 31 provide a first phase delay, and the plurality of second phase delay thin films 32 provide a second phase delay, and a difference of the first phase delay and the second phase delay is $\lambda/2$.

It is understood that the phase delay thin film 3 is a patterned phase delay thin film, i.e. FPR (Film-type Patterned Retarder), which is a film layer comprising at least two different phase delay regions.

Figure 2:
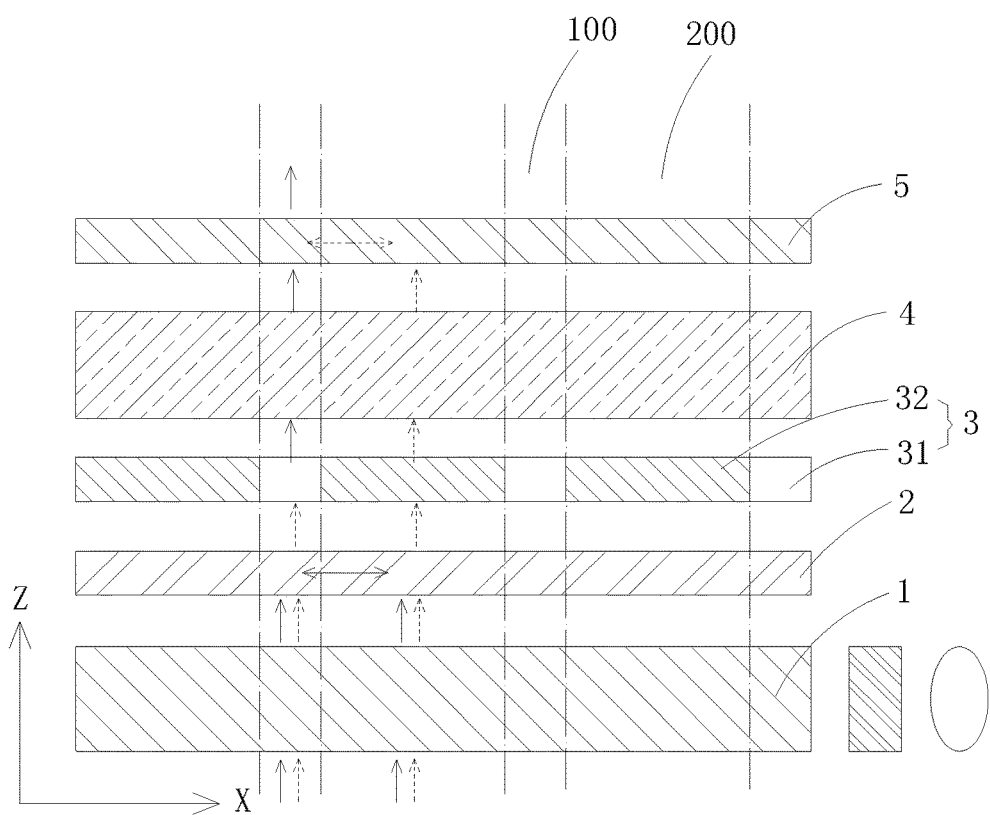
FIG. 2 is a light transmission diagram of a transparent display in a no electricity working mode provided by the embodiment of the present invention.
Figure 3:
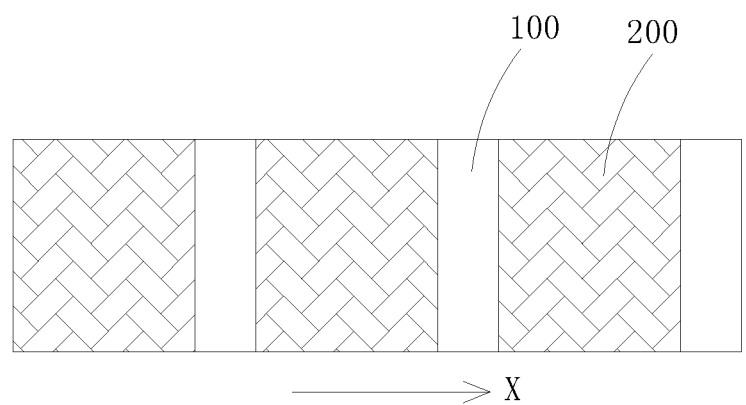
FIG. 3 is a display state diagram of a transparent display in a no electricity working mode provided by the embodiment of the present invention.
Figure 4:
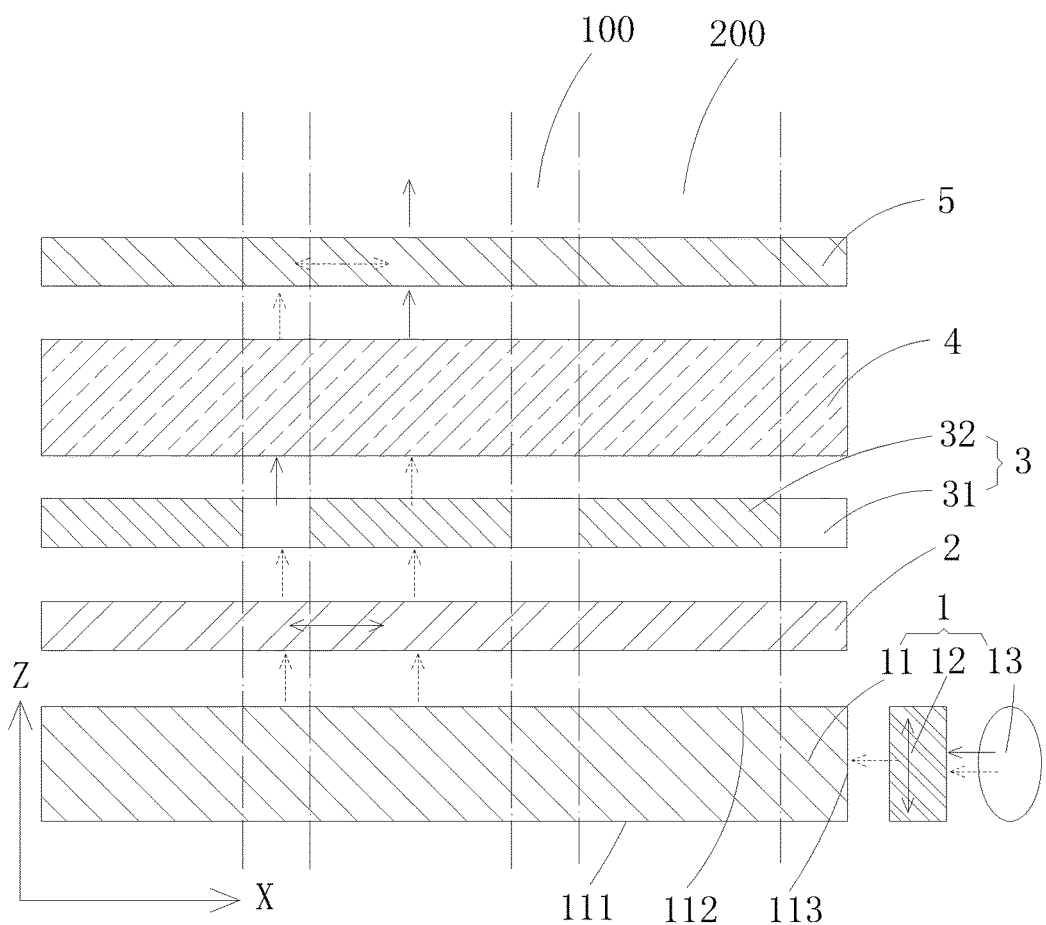
FIG. 4 is a light transmission diagram of a transparent display in an electricity working mode provided by the embodiment of the present invention.
Figure 5:
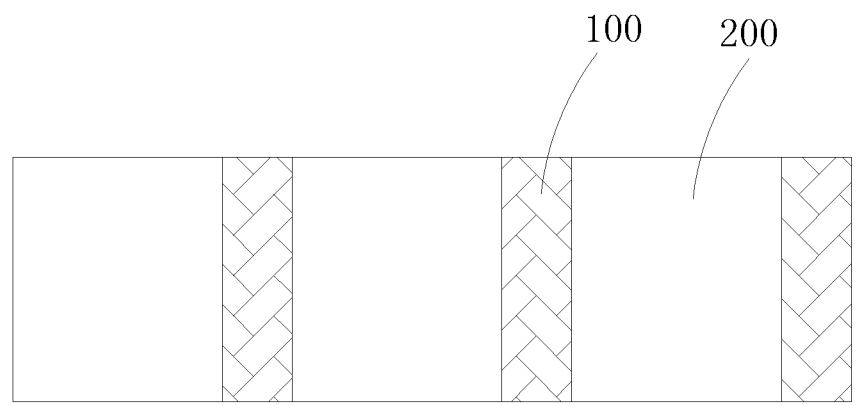
FIG. 5 is a display state diagram of a transparent display in an electricity working mode provided by the embodiment of the present invention.

As being a preferred embodiment of the present invention, referring from FIG. 2 to FIG. 5, FIG. 2 is a light transmission diagram of a transparent display in a no electricity working mode provided by the embodiment of the present invention. FIG. 3 is a display state diagram of a transparent display in a no electricity working mode provided by the embodiment of the present invention. FIG. 4 is a light transmission diagram of a transparent display in an electricity working mode provided by the embodiment of the present invention. FIG. 5 is a display state diagram of a transparent display in an electricity working mode provided by the embodiment of the present invention. A polarization axis of the upper polarizer 5 of the transparent display is perpendicular with a polarization axis of the lower polarizer 2, and the first phase delay thin film 31 delays a phase of light with $\lambda/2$ (then, the first phase delay thin film 31 acts function of $\lambda/2$ wave plate), and an extension direction of the polarization axis of the lower polarizer and an extension axis of a fast axis of the first phase delay thin film 31 form a 45° included angle, and a phase delay value of the second phase delay thin film 32 is 0.

As an illustration, the polarization axis of the upper polarizer 5 is located along the second direction, i.e. the upper polarizer 5 transmits the polarization light of the second direction, and absorbs the polarization light of the third direction which is perpendicular with the second direction, and the polarization axis of the lower polarizer 2 is located along the third direction, i.e. the lower polarizer 2 transmits the polarization light of the third direction, and absorbs the polarization light of the second direction. Then, the extension axis of the fast axis of the first phase delay thin film 31 form a 45° included angle with the third direction.

This paragraph with combination of FIG. 2 and FIG. 3 is the explanation to the working principle that the transparent display in a no electricity working mode provided by the embodiment of the present invention. The full line arrow shown in FIG. 2 represents the polarization light of the second direction, and the dot line arrow represents the polarization light of the third direction. The blank part in FIG. 3 represents the bright state, and the shadow parts represents the dark state: the natural light (including the polarization light of the second direction and the polarization light of the third direction) enters the lower polarizer 2 through the backlight module 1, and the lower polarizer 2 absorbs the polarization light of the second direction (as indicated by the full line arrow in the lower polarizer 2 in FIG. 2), and transmits the polarization light of the third direction; the polarization light of the third direction entering the first phase delay thin film 31 of the phase delay thin film 3 is delayed with $\lambda/2$ phase and converted into the polarization light of the second direction, and then enters the liquid crystal layer 4, and the polarization light of the third direction entering the second phase delay thin film 32 of the phase delay thin film 3 does not change and enters the liquid crystal layer 4; because the liquid crystal layer 4 is not electrified, all the lights entering the liquid crystal layer 4 will not change and enter the upper polarizer 5; the upper polarizer 5 absorbs the polarization light of the third direction (as indicated by the dot line arrow in the upper polarizer 5 in FIG. 2), and transmits the polarization light of the second direction. Accordingly, the polarization light of the second direction in the transparent regions 100 outgoes the transparent display through the upper polarizer 5, and the polarization light of the third direction in the display regions 200 is absorbed by the aforesaid upper polarizer 5, which appears in the state in FIG. 3. The transparent regions 100 of the transparent display are in the transparent bright state, and the display regions 200 are in the dark state as the transparent display is not powered.

It is understood that the polarization axis of the upper polarizer 5 can be located along the third direction, i.e. the upper polarizer 5 absorbs the polarization light of the second direction, and transmits the polarization light of the third direction, and then, the polarization axis of the lower polarizer 2 is located along the second direction, i.e. the lower polarizer 2 absorbs the polarization light of the third direction, and transmits the polarization light of the second direction. The extension axis of the fast axis of the first phase delay thin film 31 form a 45° included angle with the second direction. In condition that the transparent is not powered, the arrangement of the upper polarizer 5, the lower polarizer 2 and the phase delay thin film 3 similarly can make the transparent regions 100 of the transparent display be in the transparent bright state, and the display regions 200 be in the dark state as the transparent display is not electrically working. The specific working principle is similar with the working principle of the aforesaid embodiment. The description is not repeated here.

In the transparent display of the present invention, the backlight module 1, the lower polarizer 2, the phase delay thin film 3, the liquid crystal layer 4 and the upper polarizer 5 are sequentially stacked up, and the delay phase difference of the first phase delay thin films 31 of the phase delay thin film 3 in the transparent regions 100 and the second phase delay thin films 32 in the display regions 200 is $\lambda/2$. Thus, the transparent regions 100 of the transparent display can achieve the transparent bright state in condition that the transparent display is not powered to reduce the power consumption of the transparent display.

Moreover, the liquid crystal layer 4 does not change a vibration direction of a linear polarization light in condition of no power supply. Namely, the liquid crystal in the liquid crystal layer 4 can utilize the liquid crystal of any one of IPS, FFS, VA display modes or related variation modes, or can be the blue phase liquid crystal. It is understood that the transparent display utilizes any one of the ISP display mode, the FFS display mode or the VA display mode to be the display mode of the transparent display. Thus the wide view angle, high contrast, high display quality can be obtained.

Furthermore, the transparent display comprises a first substrate and a second substrate. The first substrate is located between the upper polarizer 5 and the liquid crystal layer 4, and the second substrate is located between the liquid crystal layer 4 and the phase delay thin film 3 or between the phase delay thin film 3 and the lower polarizer 2. The first substrate and the second substrate can be transparent glass substrates. Certainly, the locations of the first substrate and the second substrate of the present invention are not restricted to the types in the aforesaid embodiments. Without departing from the spirit or essential characteristics of the present invention, the solutions of the present invention achieved in other specific or similar forms should be within the protected scope of the present invention.

Furthermore, the transparent regions 100 can be hollow non color resist regions or white color resist regions, which are beneficial for raising the transparency of the transparent regions 100 of the transparent display. Besides, the plurality of transparent regions are electrically coupled to the same switch for simplifying the control operation of the transparent display; or, each transparent region 100 has its own thin film transistor (TFT) correspondingly one to one. Thus, the transparent display can flexibly control the position, area of the transparent portion and the transparent level.

Furthermore, the backlight module 1 of the transparent display in this embodiment further comprises a light guide plate 11, a backlight polarization plate 12, and a backlight source 13, and the light guide plate 11 comprises an incident surface 111 and an illuminating surface 112 which are oppositely located and a side incident surface 113 connected between the incident surface 111 and the illuminating surface 112, and the illuminating surface 112 of the light guide plate 11 is located adjacent to the lower polarizer 2, and the backlight source 13 is adjacent to the side incident surface 113 of the light guide plate 11. The backlight polarization plate 12 is located between the light guide plate 11 and the backlight source 13, and a polarization axis of the backlight polarization plate is parallel with a polarization axis of the lower polarizer. The light guide plate 11 allows the light enter the incident surface 111 and illuminates the same from the illuminating surface 112, and meanwhile, totally reflects the light entering from the side incident surface 113 and illuminates the same from the illuminating surface 112. In this embodiment, the polarization axis of the light source is located along the third direction.

It is understood that in the aforesaid embodiment, the backlight polarization plate 12 can be eliminated. The natural light emitted from the backlight source 13 completely enters the light guide plate 11, and illuminates from the illuminating surface 112 after being reflected by the incident surface 111 of the light guide plate 11. A portion of the natural light entering the lower polarizer 12 is absorbed, and the other portion transmits. Then, the light polarization state is coincident with the light polarization state formed at the same position locating the backlight polarization plate 12 in the aforesaid embodiment.

Furthermore, the light guide plate 11 is a transparent light guide plate. In this embodiment, by controlling the angle of the light entering the side incident surface 113, the incident angle of the light on the incident surface 111 is controlled to be larger than the critical angle, and then the total reflection occurs. When the outer side of the incident surface 111 is air, the critical angle is: $C=\arcsin(1/n)$, and n is the refractivity of the light guide plate 11. Furthermore, a film layer can be laminated at the side of the incident surface 111 facing the air. The refractivity of the film layer is smaller than the refractivity n of the light guide plate, and the difference is larger. A portion of the light illuminating from the incident surface 111 can be reflected at the film layer and enter the incident surface 111, again. The light output coefficient of the backlight source 13 is raised. Moreover, a plurality of air holes can be located inside the light guide plate 11, where is close to the incident surface 111 to increase the light total reflection structure to raise the light output coefficient of the backlight source 13. It is understood that the air holes can be filled with air or other transparent particles, of which the difference from the refractivity n of the light guide plat material is larger.

This paragraph with combination of FIG. 4 and FIG. 5 is the explanation to the working principle that the transparent display in an electricity working mode provided by the embodiment of the present invention. The full line arrow shown in FIG. 4 represents the polarization light of the second direction, and the dot line arrow represents the polarization light of the third direction. The blank part in FIG. 5 represents the bright state, and the shadow parts represents the dark state: the natural light emitted by the backlight source 13 (including the polarization light of the second direction and the polarization light of the third direction) enters the backlight polarization plate 12, and the backlight polarization plate 12 absorbs the polarization light of the second direction (as indicated by the full line arrow in the backlight polarization plate 12 in FIG. 4), and transmits the polarization light of the third direction; the polarization light of the third direction entering the light guide plate 11 is reflected by the incident surface 111 of the light guide plate, and then enters the lower polarizer 2, and the lower polarizer 2 absorbs the polarization light of the second direction (as indicated by the full line arrow in the lower polarizer 2 in FIG. 4), and transmits the polarization light of the third direction; the polarization light of the third direction entering the first phase delay thin film 31 of the phase delay thin film 3 is delayed with $\lambda/2$ phase and converted into the polarization light of the second direction, and then enters the liquid crystal layer 4, and the polarization light of the third direction entering the second phase delay thin film 32 of the phase delay thin film 3 does not change and enters the liquid crystal layer 4; because the liquid crystal layer 4 is electrified for working, the lights entering the liquid crystal layer 4 will change phase, and the polarization light of the second direction in the transparent regions 100 is changed to be the polarization light of the third direction, and the polarization light of the third direction in the display regions 200 is changed to be the polarization light of the second direction, and then enter the aforesaid upper polarizer 5; the upper polarizer 5 absorbs the polarization light of the third direction (as indicated by the dot line arrow in the upper polarizer 5 in FIG. 4), and transmits the polarization light of the second direction. Accordingly, the polarization light of the second direction in the display regions 200 outgoes the transparent display through the upper polarizer 5, and the polarization light of the third direction in the transparent regions 100 is absorbed by the aforesaid upper polarizer 5, which appears in the state in FIG. 5. The transparent regions 100 of the transparent display are in the dark state, and the display regions 200 are in the bright state.

It is understood that in the transparent display of the aforesaid embodiment, in electricity working mode, because the transparent regions 100 are in a dark state, it can prevent the disturbance of the transparent regions 100 to the display image of the display regions 200 to ensure the display image high quality. Furthermore, the transparent level of the transparent regions 100 can be adjusted by controlling the liquid crystal layer 4 in the transparent regions 100 (such as controlling the twisted state of the internal liquid crystal of the liquid crystal layer 4). For instance, the liquid crystal layer 4 can be adjusted to make the transparent regions 100 completely transparent. Then, the display image and the background image of the transparent regions 100 can be watched on the transparent display at the same time.

Figure 6:
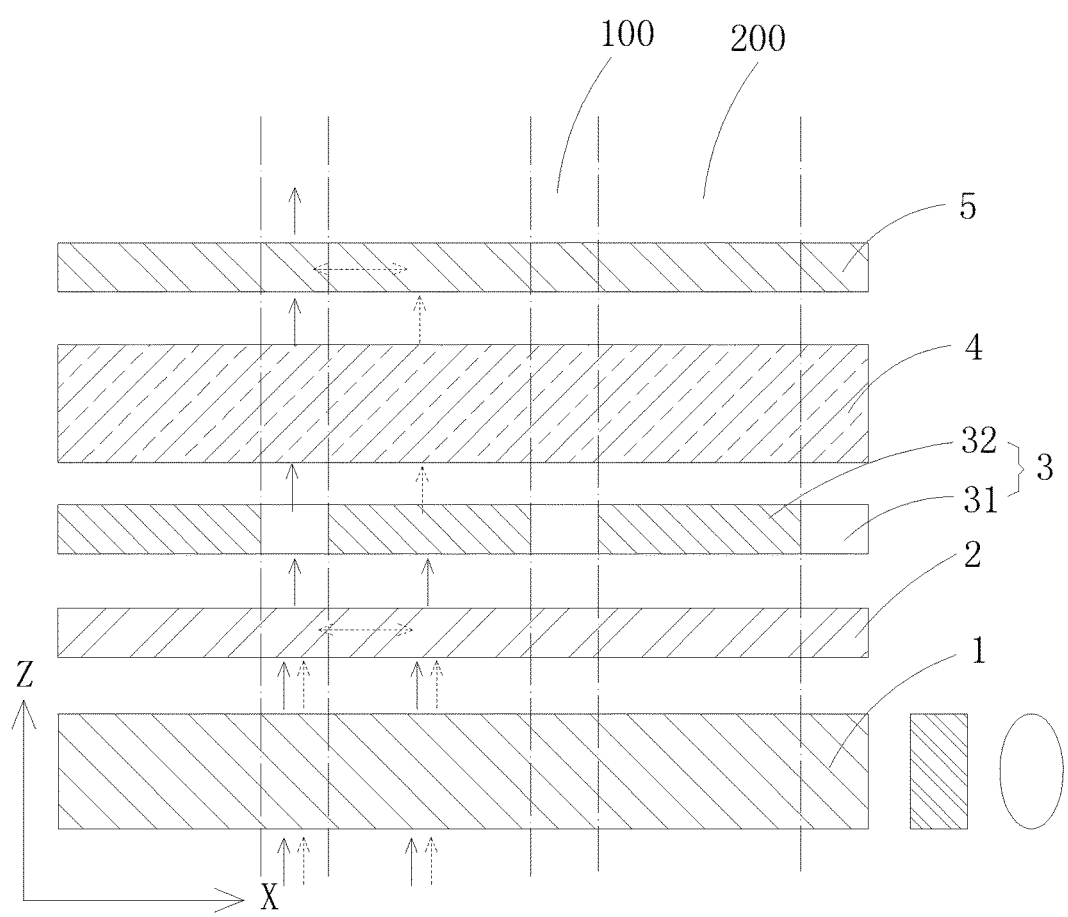
FIG. 6 is a light transmission diagram of another transparent display in a no electricity working mode provided by the embodiment of the present invention.
Figure 7:
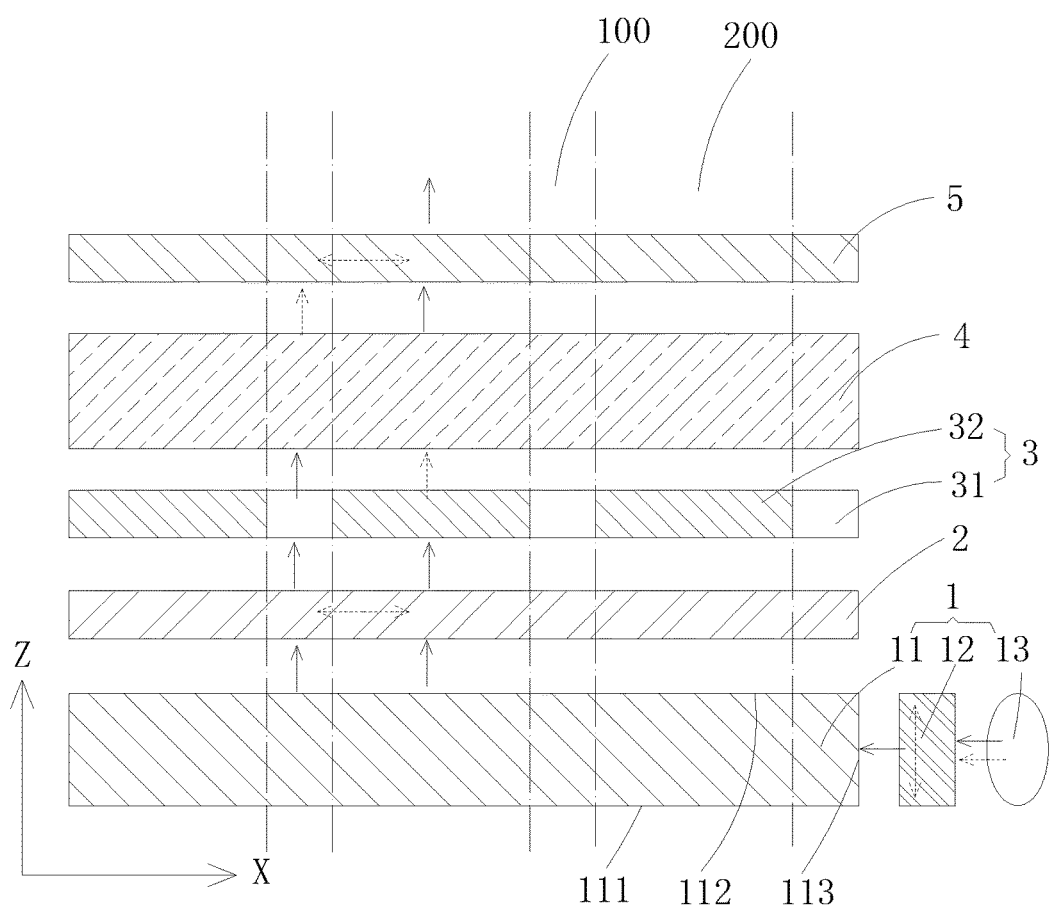
FIG. 7 is a light transmission diagram of another transparent display in an electricity working mode provided by the embodiment of the present invention.

As being another preferred embodiment of the present invention, referring from FIG. 6 to FIG. 7, and FIG. 6 is a light transmission diagram of another transparent display in a no electricity working mode provided by the embodiment of the present invention. FIG. 7 is a light transmission diagram of another transparent display in an electricity working mode provided by the embodiment of the present invention. The difference of this embodiment from the aforesaid embodiment is that the polarization axis of the upper polarizer 5 of the transparent display is parallel with the polarization axis of the lower polarizer 2. The phase delay value of the first phase delay thin film 31 is 0 (i.e. the phase delay value of the first phase delay thin film 31 is 0), and the second phase delay thin film 32 delays the light in $\lambda/2$ phase (then, the second phase delay thin film 32 acts function of $\lambda/2$ wave plate), and an extension direction of the polarization axis of the lower polarizer and an extension axis of the fast axis of the second phase delay thin film 32 form a 45° included angle.

As an illustration, the polarization axis of the upper polarizer 5 is located along the second direction, i.e. the upper polarizer 5 absorbs the polarization light of the third direction, and transmits the polarization light of the second direction, and the polarization axis of the lower polarizer 2 is located along the second direction, i.e. the lower polarizer 2 absorbs the polarization light of the third direction, and transmits the polarization light of the second direction.

This paragraph with combination of FIG. 6 is the explanation to the working principle that the transparent display in a no electricity working mode provided by the embodiment of the present invention. The full line arrow shown in FIG. 6 represents the polarization light of the second direction, and the dot line arrow represents the polarization light of the third direction: the natural light (including the polarization light of the second direction and the polarization light of the third direction) enters the lower polarizer 2 through the backlight module 1, and the lower polarizer 2 absorbs the polarization light of the third direction (as indicated by the dot line arrow in the lower polarizer 2 in FIG. 6), and transmits the polarization light of the second direction; the polarization light of the second direction entering the first phase delay thin film 31 of the phase delay thin film 3 does not change and enters the liquid crystal layer 4, and the polarization light of the second direction entering the second phase delay thin film 32 of the phase delay thin film 3 is delayed with $\lambda/2$ phase and converted into the polarization light of the third direction, and then enters the liquid crystal layer 4; because the liquid crystal layer 4 is not electrified, all the lights entering the liquid crystal layer 4 will not change phase and enter the aforesaid upper polarizer 5; the upper polarizer 5 absorbs the polarization light of the third direction (as indicated by the dot line arrow in the upper polarizer 5 in FIG. 6), and transmits the polarization light of the second direction. Accordingly, the polarization light of the second direction in the transparent regions 100 outgoes the transparent display through the upper polarizer 5, and the polarization light of the third direction in the display regions 200 is absorbed by the aforesaid upper polarizer 5. Therefore, the transparent regions 100 of the transparent display is in the transparent bright state. The display regions 200 are in the dark state as the transparent display is not electrically working.

It is understood that the polarization axis of the upper polarizer 5 can be located along the third direction, i.e. the upper polarizer 5 absorbs the polarization light of the second direction, and transmits the polarization light of the third direction, and then, the polarization axis of the lower polarizer 2 is located along the third direction, i.e. the lower polarizer 2 absorbs the polarization light of the second direction, and transmits the polarization light of the third direction. In condition that the transparent is not powered, the arrangement of the upper polarizer 5, the lower polarizer 2 and the phase delay thin film 3 similarly can make the transparent regions 100 of the transparent display be in the transparent bright state, and the display regions 200 be in the dark state as the transparent display is not electrically working. The specific working principle is similar with the working principle of the aforesaid embodiment. The description is not repeated here.

In the transparent display of the present invention, the backlight module 1, the lower polarizer 2, the phase delay thin film 3, the liquid crystal layer 4 and the upper polarizer 5 are sequentially stacked up, and the delay phase difference of the first phase delay thin films 31 of the phase delay thin film 3 in the transparent regions 100 and the second phase delay thin films 32 in the display regions 200 is $\lambda/2$. Thus, the transparent regions 100 of the transparent display can achieve the transparent bright state in condition that the transparent display is not powered to reduce the power consumption of the transparent display.

This paragraph with combination of FIG. 7 is the explanation to the working principle that the transparent display in an electricity working mode provided by the embodiment of the present invention. The full line arrow shown in FIG. 7 represents the polarization light of the second direction, and the dot line arrow represents the polarization light of the third direction: the natural light emitted by the backlight source 13 (including the polarization light of the second direction and the polarization light of the third direction) enters the backlight polarization plate 12, and the backlight polarization plate 12 absorbs the polarization light of the third direction (as indicated by the dot line arrow in the backlight polarization plate 12 in FIG. 7), and transmits the polarization light of the second direction; the polarization light of the third direction entering the light guide plate 11 is reflected by the incident surface 111 of the light guide plate, and then enters the lower polarizer 2, and the lower polarizer 2 absorbs the polarization light of the second direction (as indicated by the full line arrow in the lower polarizer 2 in FIG. 7), and transmits the polarization light of the second direction; the polarization light of the second direction entering the first phase delay thin film 31 of the phase delay thin film 3 does not change and enters the liquid crystal layer 4, and the polarization light of the second direction entering the second phase delay thin film 32 of the phase delay thin film 3 is delayed with $\lambda/2$ phase and converted into the polarization light of the third direction, and then enters the liquid crystal layer 4; the liquid crystal layer 4 is electrified for working, and the lights entering the liquid crystal layer 4 will change phase, and the polarization light of the second direction in the transparent regions 100 is changed to be the polarization light of the third direction, and the polarization light of the third direction in the display regions 200 is changed to be the polarization light of the second direction, and then enter the aforesaid upper polarizer 5; the upper polarizer 5 absorbs the polarization light of the third direction (as indicated by the dot line arrow in the upper polarizer 5 in FIG. 7), and transmits the polarization light of the second direction. Accordingly, the polarization light of the second direction in the display regions 200 outgoes the transparent display through the upper polarizer 5, and the polarization light of the third direction in the transparent regions 100 is absorbed by the aforesaid upper polarizer 5. The transparent regions 100 of the transparent display are in the dark state, and the display regions 200 are in the bright state.

It is understood that in the transparent display of the aforesaid embodiment, in electricity working mode, because the transparent regions 100 are in a dark state, it can prevent the disturbance of the transparent regions 100 to the display image of the display regions 200 to ensure the display image high quality. Furthermore, the transparent level of the transparent regions 100 can be adjusted by controlling the liquid crystal layer 4 in the transparent regions 100 (such as controlling the twisted state of the internal liquid crystal of the liquid crystal layer 4). For instance, the liquid crystal layer 4 can be adjusted to make the transparent regions 100 completely transparent. Then, the display image and the background image of the transparent regions 100 can be watched on the transparent display at the same time.

Certainly, in the aforesaid embodiment, the backlight polarization plate 12 can be eliminated. The natural light emitted from the backlight source 13 completely enters the light guide plate 11, and illuminates from the illuminating surface 112 after being reflected by the incident surface 111 of the light guide plate 11. A portion of the natural light entering the lower polarizer 12 is absorbed, and the other portion transmits. Then, the light polarization state is coincident with the light polarization state formed at the same position locating the backlight polarization plate 12 in the aforesaid embodiment.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A transparent display, comprising a backlight module, a lower polarizer, a phase delay thin film, a liquid crystal layer and an upper polarizer, which are sequentially stacked up in an image display direction, and the transparent display alternately comprises a plurality of transparent regions and a plurality of display regions in a first direction perpendicular with the image display direction, and the phase delay thin film comprises a plurality of first phase delay thin films located in the plurality of transparent regions and a plurality of second phase delay thin films located in the plurality of display regions, and the plurality of first phase delay thin films provide a first phase delay, and the plurality of second phase delay thin films provide a second phase delay, and a difference of the first phase delay and the second phase delay is $\lambda/2$; and wherein a polarization axis of the upper polarizer is parallel with a polarization axis of the lower polarizer, and a phase delay value of the first phase delay thin film is 0, and the second phase delay thin film delays a phase of light with $\lambda/2$, and an extension direction of the polarization axis of the lower polarizer and an extension axis of a fast axis of the second phase delay thin film form a 45° included angle.

2. The transparent display according to claim 1, wherein the liquid crystal layer does not change a vibration direction of a linear polarization light in condition of no power supply.

3. The transparent display according to claim 2, wherein the transparent display further comprises a first substrate and a second substrate, and the first substrate is located between the upper polarizer and the liquid crystal layer, and the second substrate is located between the liquid crystal layer and the phase delay thin film.

4. The transparent display according to claim 2, wherein the transparent display further comprises a first substrate and a second substrate, and the first substrate is located between the upper polarizer and the liquid crystal layer, and the second substrate is located between the phase delay thin film and the lower polarizer.

5. The transparent display according to claim 1, wherein transparent regions are non color resist regions or white color resist regions, and the plurality of transparent regions are electrically coupled to the same switch; and wherein the backlight module comprises a light guide plate and a backlight source, and the light guide plate comprises an incident surface and an illuminating surface which are oppositely located and a side incident surface connected between the incident surface and the illuminating surface, and the illuminating surface of the light guide plate is located adjacent to the lower polarizer, and the backlight source is adjacent to the side incident surface of the light guide plate.

6. The transparent display according to claim 1, wherein transparent regions are non color resist regions or white color resist regions, and each transparent region correspondingly comprises a thin film transistor.

7. A transparent display, comprising a backlight module, a lower polarizer, a phase delay thin film, a liquid crystal layer and an upper polarizer, which are sequentially stacked up in an image display direction;

the transparent display alternately comprises a plurality of transparent regions and a plurality of display regions in a first direction perpendicular with the image display direction;

the phase delay thin film comprises a plurality of first phase delay thin films located in the plurality of transparent regions and a plurality of second phase delay thin films located in the plurality of display regions;

the plurality of first phase delay thin films provide a first phase delay, and the plurality of second phase delay thin films provide a second phase delay, and a difference of the first phase delay and the second phase delay is $\lambda/2$;

wherein the backlight module comprises a light guide plate and a backlight source, and the light guide plate comprises an incident surface and an illuminating surface which are oppositely located and a side incident surface connected between the incident surface and the illuminating surface, and the illuminating surface of the light guide plate is located adjacent to the lower polarizer, and the backlight source is adjacent to the side incident surface of the light guide plate; and wherein the backlight module further comprises a backlight polarization plate, and the backlight polarization plate is located between the light guide plate and the backlight source, and a polarization axis of the backlight polarization plate is parallel with a polarization axis of the lower polarizer.

* * * * *